W. W. IRWIN.
BRAKE OPERATING MECHANISM.
APPLICATION FILED NOV. 23, 1910.
986,826.
Patented Mar. 14, 1911.
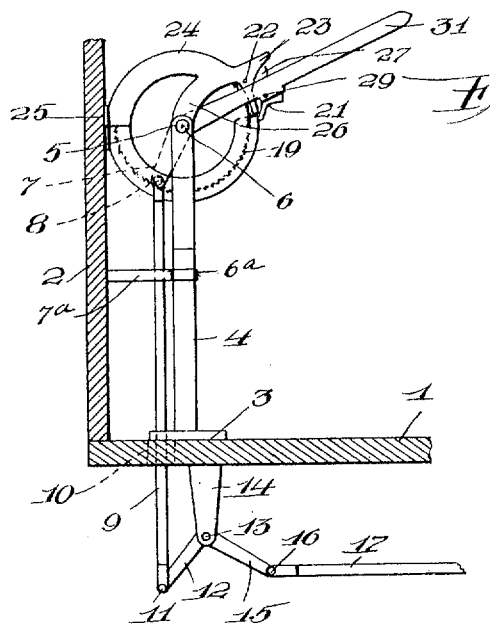
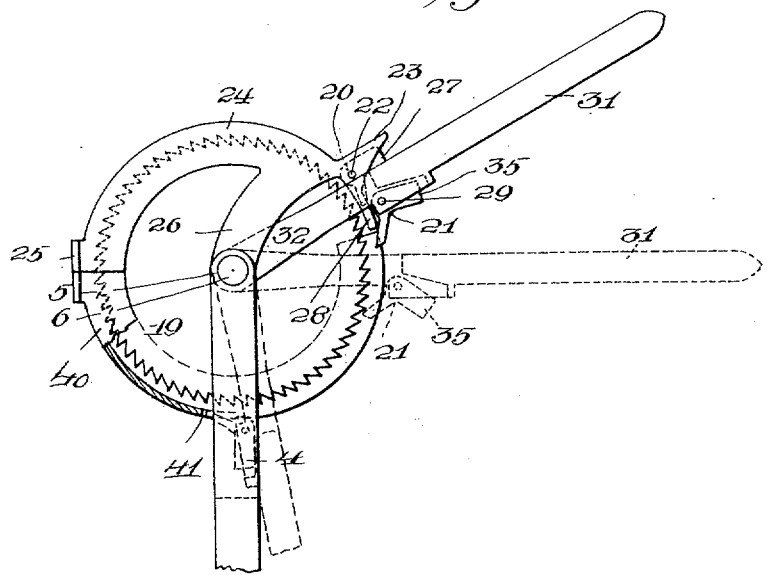
WITNESSES
Samuel Payne
K. H. Butler
INVENTOR
W. W. Irwin,
by N. C. Evert & Co.
Attorneys.

W. W. IRWIN.
BRAKE OPERATING MECHANISM.
APPLICATION FILED NOV. 23, 1910.
986,826.
Patented Mar. 14, 1911.
2 SHEETS—SHEET 2.
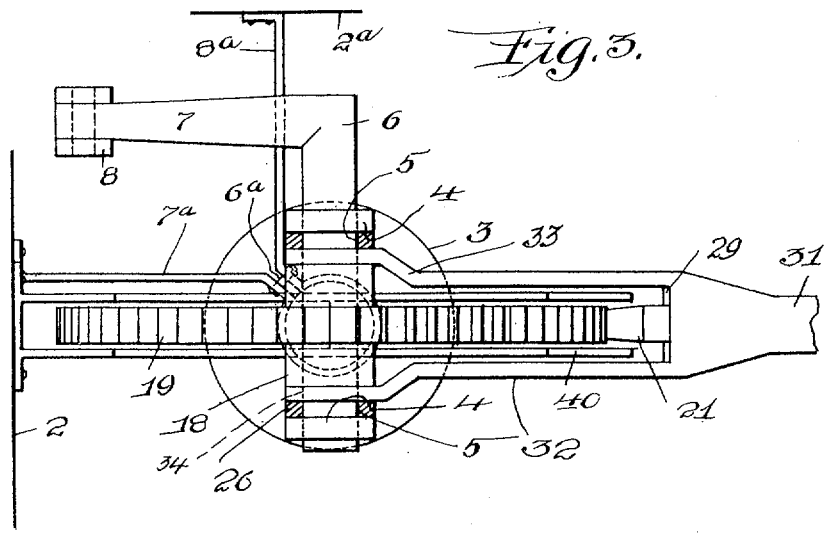
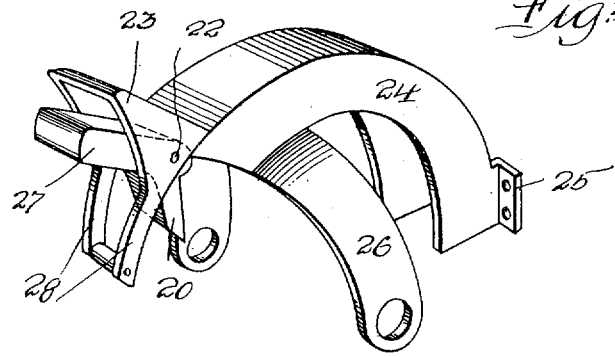
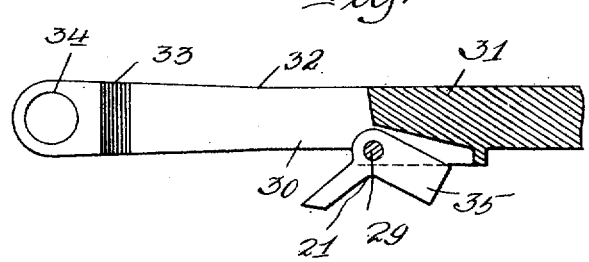
Witnesses:
Samuel Payne
K. H. Butler
Inventor
W. W. Irwin,
by H. C. Evert Co.
Attorneys.

UNITED STATES PATENT OFFICE.

WALTER W. IRWIN, OF EL PASO, TEXAS.

BRAKE-OPERATING MECHANISM.

986,826.   Specification of Letters Patent.   Patented Mar. 14, 1911.

Application filed November 23, 1910. Serial No. 593,801.

*To all whom it may concern:*

Be it known that I, WALTER W. IRWIN, a citizen of the United States of America, residing at El Paso, in the county of El Paso and State of Texas, have invented certain new and useful Improvements in Brake-Operating Mechanism, of which the following is a specification, reference being had therein to the accompanying drawing.

This invention relates to a brake wheel especially designed for street cars, the object of the invention being to provide a wheel that will occupy a comparatively small space upon the platform of a car and permitting the motorman or operator of the car to obtain considerable leverage to set the brakes of the car.

A further object of the invention is to provide a brake wheel that can be easily and quickly operated, particularly in case of an emergency, the wheel being fully guarded whereby the motorman of the car or passengers entering or leaving the car from the front platform cannot be injured by the brake wheel or handle.

I attain the above objects by a mechanical construction that will be hereinafter specifically described and then claimed, and reference will now be had to the drawings forming part of this specification, wherein:—

Figure 1 is a side elevation of the brake wheel, showing a portion of the car in section, Fig. 2 is an enlarged elevation of the brake wheel, Fig. 3 is a plan of the same with one of the guards thereof removed, Fig. 4 is an enlarged perspective view of a detached guard, and Fig. 5 is an enlarged longitudinal sectional view of a portion of the operating lever.

In the accompanying drawings 1 denotes a car platform having a dash-board 2, and a side wall 2ª, and mounted upon said platform is a base plate 3 having standards 4 arranged in parallelism with the upper end thereof apertured, as at 5 for a shaft 6. One end of the shaft 6 has a crank 7 pivotally connected, as at 8 to a rod 9, said rod extending through an opening 10 provided therefor in the car platform 1. The lower end of the rod 9 is connected, as at 11 to the short arm 12 of a bell crank lever pivotally mounted, as at 13 in a hanger 14, carried by the platform 1. The long arm 15 of the bell crank lever is pivotally connected, as at 16 to a brake rod 17, this brake rod operating the brake shoes of a car (not shown). The standard 4 is braced by straps 7ª and 8ª connected to the dash-board 2 and the side wall 2ª, said straps being clamped around the standard, as at 6ª.

Keyed or otherwise mounted upon the shaft 6 is the hub 18 of a ratchet wheel 19, and adapted to engage said ratchet wheel are two pawls 20 and 21. The former is pivotally mounted, as at 22 in a housing 23 carried by a curved or segment-shaped guard 24 secured, as at 25 to the dash-board 2, the guard being channel-shaped in cross section to inclose the upper edge of the ratchet wheel 19. The guard 24 has the forward end thereof provided with two depending curved apertured arms 36 loosely mounted upon the shaft 6, these arms assisting in supporting the guard in position over the ratchet wheel 19 and preventing said guard from sagging. The pawl 20 has one end thereof enlarged or weighted, as at 27, while the opposite end thereof is adapted to recede into a stirrup 28, carried by the housing 23. The pawl 21 is pivotally mounted, as at 29 in the bifurcation 30 of an operating lever 31, said operating lever being bifurcated to provide arms 32, which are off-set, as at 33 and apertured, as at 34, whereby the operating lever can be loosely mounted upon the shaft 6 at the outer ends of the hub 18. One end of the pawl 21 is enlarged or weighted, as at 35, while the opposite end thereof is adapted to engage the stirrup 28 to throw the pawl out of engagement with the ratchet wheel 19, when the operating lever is elevated, the operating lever when elevated also contacting with the weighted end 27 of the pawl 20, shifting said pawl and moving the same out of engagement with the ratchet wheel. The pawl 20 serves functionally as a lock for the ratchet wheel 19 to prevent a rearward rotation of the same, while the pawl 21 is employed for rotating the ratchet wheel 19 when the operating lever 31 is reciprocated.

An additional or lower guard 40 is secured to the dash-board 2 of the car, this guard extending under the ratchet wheel 19, said guard being channel-shaped in cross section for approximately one-half its length with the base or web thereof cut away, as at 41 to provide clearance for the operating lever 31 when in a lowered position, thus allowing the operating lever to make a complete stroke to move the shaft 6.

From the foregoing it will be observed that the arrangement of the operating lever 31 permits of the motorman or operator of the car obtaining considerable leverage to rotate the ratchet wheel 19 and the shaft 6, elevate the outer end of the crank 7 and set the brake shoes directly or indirectly connected to the rod 17.

What I claim is:—

1. In a brake wheel, the combination with a rotatable shaft having a crank, adapted to set the brake shoes of a car on an upward movement of said crank, of a ratchet wheel mounted upon the shaft at a point removed from the crank, an operating lever loosely mounted upon said shaft, a weighted pawl carried by said lever and adapted to normally engage said ratchet wheel for rotating said shaft, a guard mounted over the upper edges of said ratchet wheel and operative connections attached to the crank for setting the brake shoes, a weighted locking pawl carried by said guard and adapted to prevent a rearward rotation of said ratchet wheel.

2. In a brake wheel, the combination with a rotatable shaft adapted to set the brake shoes of a car, of a ratchet wheel mounted upon said shaft, an operating lever loosely mounted upon said shaft, a pawl carried by said operating lever and adapted to engage said ratchet wheel, a guard mounted over the upper edge of said ratchet wheel, a housing carried by said guard, a locking pawl mounted in said housing and adapted to engage said ratchet wheel and prevent a rearward rotation thereof, and a stirrup carried by said housing and adapted to shift the pawl of said operating lever out of engagement with said ratchet wheel.

3. In a brake wheel, the combination with a rotatable shaft adapted to set the brake shoes of a car, of a ratchet wheel mounted over said shaft, an operating lever loosely mounted upon said shaft, a guard mounted over the upper edge of said ratchet wheel, a locking pawl carried by said guard and adapted to prevent a rearward rotation of said ratchet wheel, said locking pawl being moved out of engagement with said ratchet wheel by said operating lever, a stirrup carried by said guard, and a pawl carried by said operating lever for rotating said ratchet wheel and adapted to be moved out of engagement therewith by said stirrup and an upward movement of said operating lever.

4. In a brake wheel, the combination with a rotatable shaft having a crank, and brake shoes adapted to be set by an upward movement of said crank, of a ratchet wheel mounted upon said shaft, an operating lever loosely mounted upon said shaft, a weighted pawl carried by said lever and adapted to normally engage said ratchet wheel for rotating said shaft, a guard mounted over the upper edges of said ratchet wheel, a weighted locking pawl carried by said guard and adapted to prevent a rearward rotation of said ratchet wheel, and a lower guard having the web thereof cut away to provide clearance for said operating lever.

In testimony whereof I affix my signature in the presence of two witnesses.

WALTER W. IRWIN.

Witnesses:
MARY CHRISTY IRWIN,
EDWIN FOWLER.